US012540509B2

(12) United States Patent
Jasak et al.

(10) Patent No.: US 12,540,509 B2
(45) Date of Patent: Feb. 3, 2026

(54) LADDER FASCIA CLAMP AND LOCK

(71) Applicant: Miroslaw Jasak, Elk Grove Village, IL (US)

(72) Inventors: Miroslaw Jasak, Elk Grove Village, IL (US); Johan de Beer, Pretoria (ZA); Eben Meyburgh, Pretoria (ZA); Tasos Calantzis, Pretoria (ZA)

(73) Assignee: Mirsolaw Jasak, Elk Grove Village, IL (US)

(*) Notice: Subject to any disclaimer, the term of this patent is extended or adjusted under 35 U.S.C. 154(b) by 809 days.

(21) Appl. No.: 17/816,248

(22) Filed: Jul. 29, 2022

(65) Prior Publication Data

US 2023/0032716 A1 Feb. 2, 2023

Related U.S. Application Data

(60) Provisional application No. 63/203,800, filed on Jul. 30, 2021.

(51) Int. Cl.
*E06C 7/48* (2006.01)

(52) U.S. Cl.
CPC .................................... *E06C 7/486* (2013.01)

(58) Field of Classification Search
CPC . E06C 7/486; E06C 7/188; E06C 7/48; E06C 7/18; E06C 7/505; E06C 1/34; F16B 2/12; B25B 5/068
See application file for complete search history.

(56) References Cited

U.S. PATENT DOCUMENTS

| | | | | |
|---|---|---|---|---|
| 3,268,196 | A | 8/1966 | Anton, Sr. | |
| 4,765,439 | A | 8/1988 | Kresmery | |
| 5,009,134 | A | 4/1991 | Sorensen et al. | |
| 7,140,582 | B1 * | 11/2006 | Miller | B25B 5/163 269/166 |
| 7,325,335 | B2 | 2/2008 | Cok-Euell | |
| 7,445,086 | B1 | 11/2008 | Sizemore | |
| 9,551,183 | B2 * | 1/2017 | Rudd | F16B 2/12 |
| 9,751,193 | B2 | 9/2017 | Evatt et al. | |
| 9,797,195 | B2 * | 10/2017 | DeCuir | E06C 7/486 |
| 10,060,186 | B2 | 8/2018 | Cherevko et al. | |
| 10,415,312 | B1 * | 9/2019 | Conroy | E06C 7/188 |
| 10,655,391 | B1 | 5/2020 | Clark | |
| 2006/0124394 | A1 * | 6/2006 | Bracken | E06C 1/34 182/107 |
| 2009/0145693 | A1 * | 6/2009 | Arseneault | E06C 7/486 182/206 |
| 2009/0255759 | A1 | 10/2009 | Barnes | |

(Continued)

*Primary Examiner* — David E Martinez
(74) *Attorney, Agent, or Firm* — Greer, Burns & Crain, Ltd

(57) ABSTRACT

A clamping device for securing a ladder to a structure including a housing having a first, ladder end, and a second, building end opposite the ladder end, the housing defining an internal cavity. The clamping device utilizes a clamp with a housing end disposed within the housing and an opposite, grip end configured for releasable attachment to the structure. The clamp laterally reciprocates relative to the housing between an extended position and a retracted position. Additionally, the clamping device also includes a ladder hook associated with the ladder end of the housing for releasable engagement with the ladder, and an actuator associated with the housing and configured for causing lateral reciprocation of the clamp relative to the housing.

31 Claims, 6 Drawing Sheets

(56) References Cited

U.S. PATENT DOCUMENTS

| | | | | |
|---|---|---|---|---|
| 2014/0166397 | A1 * | 6/2014 | Reynolds ................ | E06C 7/188<br>29/428 |
| 2017/0058604 | A1 | 3/2017 | Minette et al. | |

* cited by examiner

LADDER FASCIA CLAMP AND LOCK

RELATED APPLICATION

The present application is a Non-Provisional of, and claims priority under 35 USC 119 from U.S. Provisional Application Ser. No. 63/203,800 filed Jul. 30, 2021, the contents of which are incorporated by reference herein.

BACKGROUND

The present invention relates to a clamping device and, more specifically, a device for securing a ladder to a wall.

One known way to secure a ladder to a wall involves directly fixing the ladder to a wall or structure by securing a ladder stabilizer directly to a wall with a bolt or fastener. Such ladder stabilizers are very bulky, require considerable time and effort to install and risk causing damage to the building to which the ladder is secured.

Another type of known device for securing a ladder against a wall hangs directly from a gutter. However, such known devices do not come into direct contact with the wall and do not always provide a secure connection between the ladder and wall. Additionally, gutters are not always a structurally reliable anchoring place for securing a ladder.

A problem of the above-mentioned known ladder securing technology is that known devices do not provide a simple solution for securing the ladder to the wall. Many of the known devices are designed to be installed before the ladder is deployed. This separate installation step can be both complex and time consuming, and does not allow for the ladder to be easily shifted into new locations along a structure.

Accordingly, there is a need for a device that can quickly and simply secure a ladder to a wall and provide a structurally secure and reliable, while temporary connection.

SUMMARY

The above-listed need is met or exceeded by the present device for securing a ladder to a structure. A feature of the present ladder clamping device is a hand-operated lever that actuates a fascia wedge, which can be releasably attached to a variety of structures, towards a ladder hook, which is secured to a ladder. As such, the movement of the fascia wedge relative to the ladder hook creates a clamping force that acts on the ladder, thereby securing the ladder to the structure. The present ladder securing device is easily actuated by the user with one hand using the biased, hand-operated lever. Furthermore, the structure of the present clamping device, including the fascia wedge, ladder hook, and deployable gutter hook promotes a strong and secure connection between the ladder and the structure.

More specifically, a clamping device for securing a ladder to a structure is provided. In the preferred embodiment, the clamping device includes a housing with a first, ladder end, and an opposing second, building end. The housing further defines an internal cavity.

A clamp is included in the clamping device that is partially enclosed within the housing. The clamp has a housing end that is disposed within the housing and an opposite grip end, which extends outside the housing and is configured for releasable attachment to the structure. The present clamping device is adaptable to a broad variety of structures, which may include fascia boards and a gutter, among other things. In the preferred embodiment, the clamp reciprocates laterally relative to the housing between an extended position and a retracted position.

Also included in the present clamping device is a ladder hook. The ladder hook is associated with and disposed proximate the ladder end of the housing and releasably engages with the ladder.

An actuator is associated with the housing and is provided for laterally reciprocating the clamp relative to the housing. The actuator preferably includes a handle with a stationary grip portion and a lever that is pivotally secured to the housing. The lever is movable between a rest position and a retracted position, and a biasing element pushes the lever towards the rest position. In the preferred embodiment, the lever is also provided with a clamp opening that slidably engages with the clamp. When the lever is actuated, the grip end of the clamp is drawn towards housing.

Preferably, the internal cavity of the housing includes a housing track, and the clamp includes an upper surface and a lower surface that define a clamp track. The clamp track slidably engages with the both the clamp opening of the lever and the housing track.

According to another aspect of the clamping device, the lever also comprises a clamp opening, and the clamp track is disposed within the clamp opening. Preferably, the clamp opening is dimensioned such that as the lever is actuated from the rest position to the retracted position, an inner surface of the clamp opening engages the lower surface of the clamp. This engagement is configured so that the inner surface of the clamp opening slides the grip end of the clamp towards the housing.

According to another aspect of the clamping device, the housing track includes parallel, vertically spaced ribs that slidably engage with the clamp track.

In a preferred embodiment, the clamping device includes a fascia wedge disposed at the grip end of the clamp for releasable attachment to the structure. Preferably, the fascia wedge extends perpendicular relative to an axis defined by the clamp.

In an embodiment, the fascia wedge is provided with an upper surface and a lower surface. The upper surface of the fascia wedge has a first gripping surface and the lower surface of the fascia wedge has a second gripping surface. The fascia wedge optionally includes a fascia wedge opening dimensioned to receive a fastener, preferably a threaded fastener for securing the fascia wedge to the structure.

A clamp track release tab is provided and extends from the second, building end of the housing. Included on the clamp track release tab is a release tab opening, and the clamp track is disposed within and slides through the release tab opening. The release tab opening is dimensioned so that in a first, oblique position relative to the clamp, reciprocal movement of the clamp is prevented, and in a second, normal position, reciprocal movement of the clamp is permitted.

According to another aspect of the device, the clamping device also includes a gutter hook that is rotatably attached to the housing between the first and second ends. The gutter hook is adjustable between a deployed position and a retracted position. In the deployed position, the gutter hook extends from the housing at an oblique angle relative to the axis defined by the clamp. In contrast, the gutter hook is substantially parallel to the axis defined by the clamp in the retracted position.

In another aspect of the clamping device, the ladder hook includes a first end disposed within the housing, a second hooked end, and an intermediate portion extending between the first end and the second hooked end. The ladder hook is laterally adjustable such that intermediate portion slides into the housing at an oblique angle relative to the axis defined by the clamp. Additionally, the ladder hook is adjustable such that it may rotate about an axis concentric with the intermediate portion of the ladder hook.

DETAILED DESCRIPTION

Figure 1:
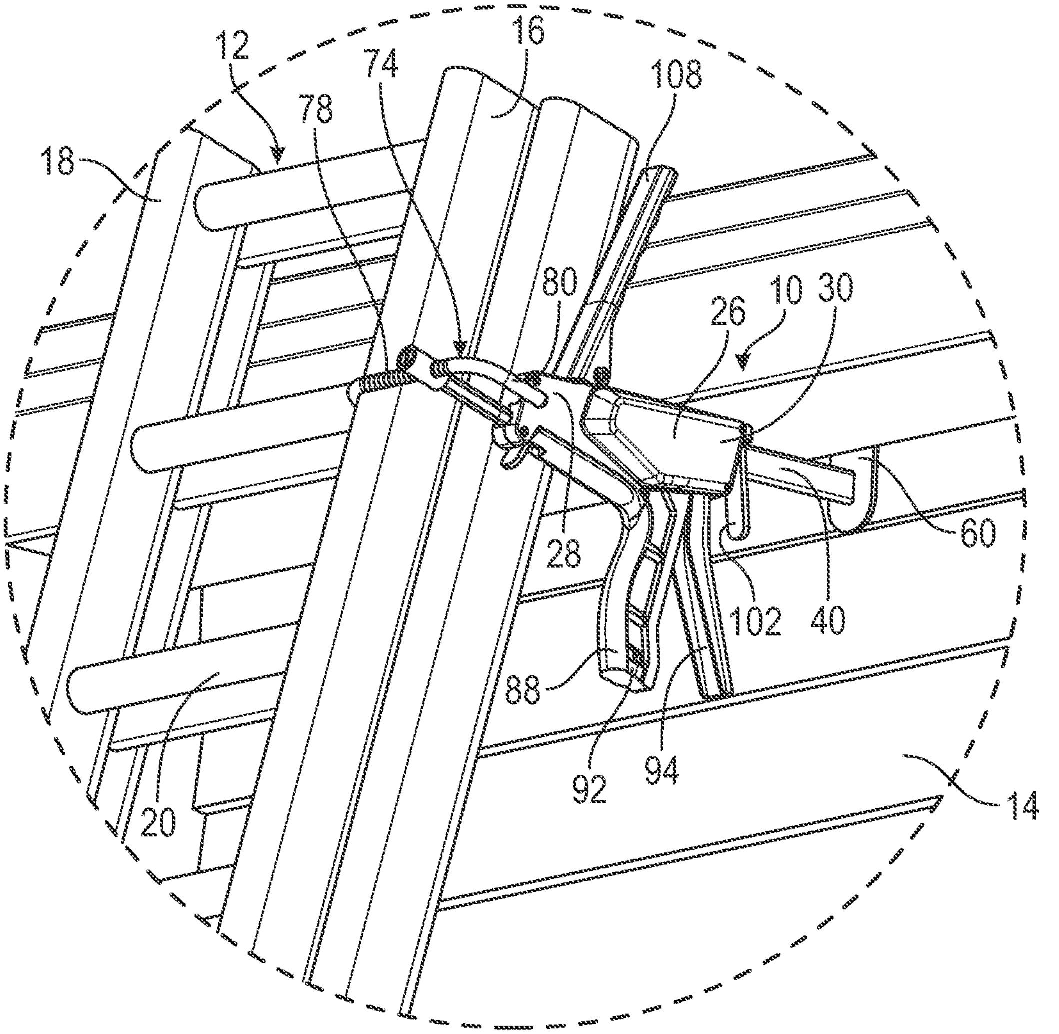
FIG. 1 is a rear perspective view of an embodiment of the present clamp securing a ladder to a wall.

Referring now to FIG. 1, a clamping device, generally designated 10 is provided for securing a ladder 12 to a structure 14. As is known in the art, the ladder 12 includes a first rail 16, a second rail 18, and a plurality of vertically spaced, parallel rungs 20 secured to the rails 16 and 18. As illustrated, the structure 14 includes a gutter 22 and fascia boards 24. However, the clamping device 10 is configured for securing the ladder 12 to a broad variety of structures 16, including, but not limited to, walls and structures made of wood or brick.

The clamping device 10 is provided with a housing 26. The housing 26 includes a first, ladder end 28, and a second, building end 30, best seen in FIG. 2. As shown in FIG. 3, the housing 26 defines an internal cavity 32. Disposed in the internal cavity 32, a housing track 34 is formed by two parallel, vertically spaced ribs 36.

Figure 2:
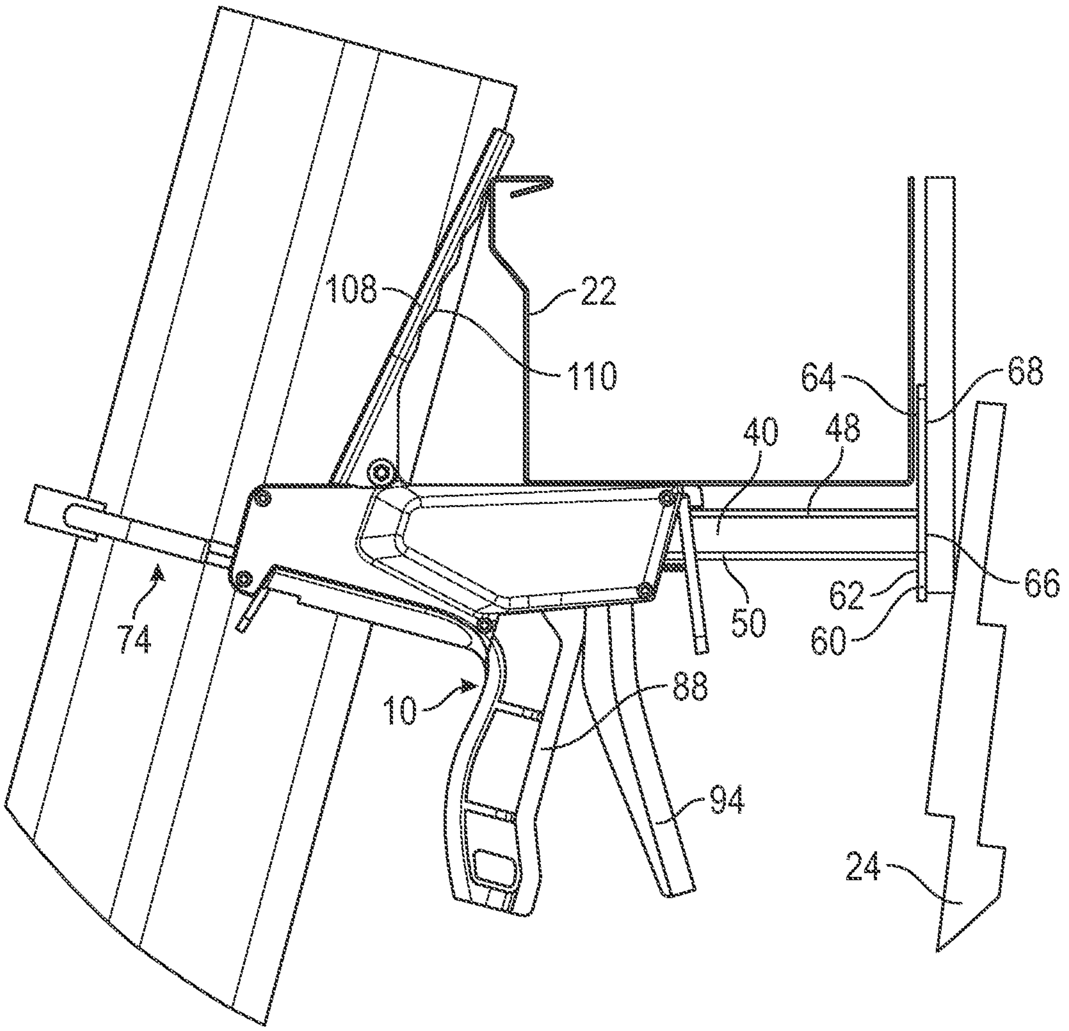
FIG. 2 is a side elevational view of an embodiment of the present clamp securing a ladder to a wall.
Figure 3:
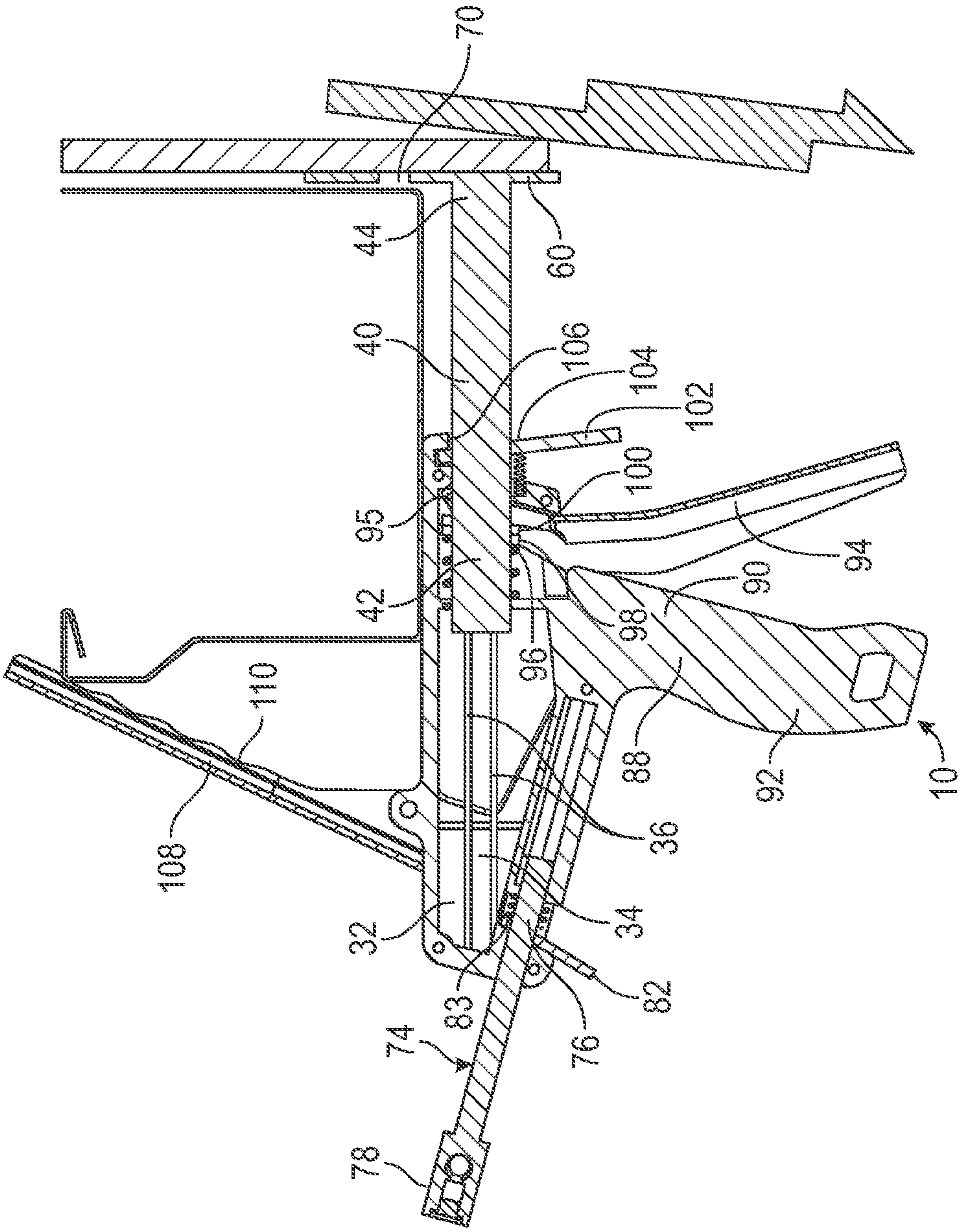
FIG. 3 is a cross-section taken along the line 3-3 of FIG. 1 and in the direction generally indicated.

Referring now to FIGS. 2 and 3, the clamping device 10 includes a clamp 40, which is partially enclosed in the internal cavity 32 of the housing 26. The clamp 40 includes a clamp housing end 42 disposed in the internal cavity 32 of the housing 26, and an opposing clamp grip end 44 that extends from the housing 26 at the ladder end 28. The clamp 40 is designed such that it laterally reciprocates along the vertically spaced ribs 36 that form the housing track 34. To allow for this reciprocation, the clamp 40 includes a clamp track 46 defined by an upper surface 48 and a lower surface 50 of the clamp 40 that extend from the housing end 42 to the grip end 44. The clamp track 50 engages with the housing track 34 such that the clamp 40 laterally reciprocates along a longitudinal axis 52 defined by the clamp 40.

The clamping device 10 is further provided with a fascia wedge 60 disposed at the grip end 44 of the clamp 40 for releasable attachment to the structure 14. The fascia wedge 60 generally extends perpendicularly from the longitudinal axis 52 of the clamp 40. In order to create a strong connection between the clamping device 10 and the structure 14, the fascia wedge 60 includes an upper wedge surface 62 having a first gripping surface 64 and a lower wedge surface 66 having a second gripping surface 68. As shown in FIG. 2, the second gripping surface 68 of the fascia wedge 60 directly contacts an outer surface of the structure 14. Optionally, the first gripping surface 64 of the fascia wedge 60 is positioned such that it is in contact with the gutter 22, as shown in FIG. 2. The first gripping surface 64 is also preferably positioned such that it is in contact with an inner surface of the facia board 24, or any other suitable surface on the structure 14.

A fascia wedge opening 70, best seen in FIG. 3, is formed on the fascia wedge 60 and extends from the upper wedge surface 65 to the lower wedge surface 68. The fascia wedge opening 70 is formed in the fascia wedge 60 so that a fastener 72, preferably a threaded fastener, may optionally be driven into the structure 14 through the fascia wedge 60 to provide strengthen the connection between the fascia wedge 60 and the structure 14. When the first gripping surface 64 of the fascia wedge 60 is not in contact with any surface of the structure 14, the fastener 72 is particularly useful in creating a strong connection between the fascia wedge 60 and the structure 14.

In order for the clamping device 10 to releasably engage with the ladder 12, a ladder hook 74 is disposed at and extends proximate to the ladder end 28 of the housing 26. As seen in FIG. 1, the ladder hook 74 is configured to secure around the first rail 16 of the ladder 12. The ladder hook 74 is provided with a first end 76, best seen in FIG. 3, disposed within the housing 26, a second hooked end 78, and an intermediate portion 80 extending the between the first end 76 and the second hooked end 78 of the ladder hook 74. In order to accommodate ladders 12 of different sizes, the ladder hook 74 is adjustable laterally such that the intermediate portion 80 slides into the housing 26 at an oblique angle relative to the axis 52. When a ladder hook release tab 82 is actuated by a user, the ladder hook release tab 82 is moved to a depressed position and the ladder hook 74 is laterally adjusted such that the intermediate portion 80 slides relative to housing 26 until the ladder hook 74 is in the desired position. The ladder hook release tab 82 is biased to a locked position, as shown in FIG. 3, by a ladder hook biasing element 83. When the ladder hook release tab 82 is in the locked position, the ladder hook 74 cannot be moved laterally.

Additionally, the ladder hook 74 is rotatably adjustable such that it rotates about an axis concentric with the intermediate portion 80 of the ladder hook 74.

Figure 4:
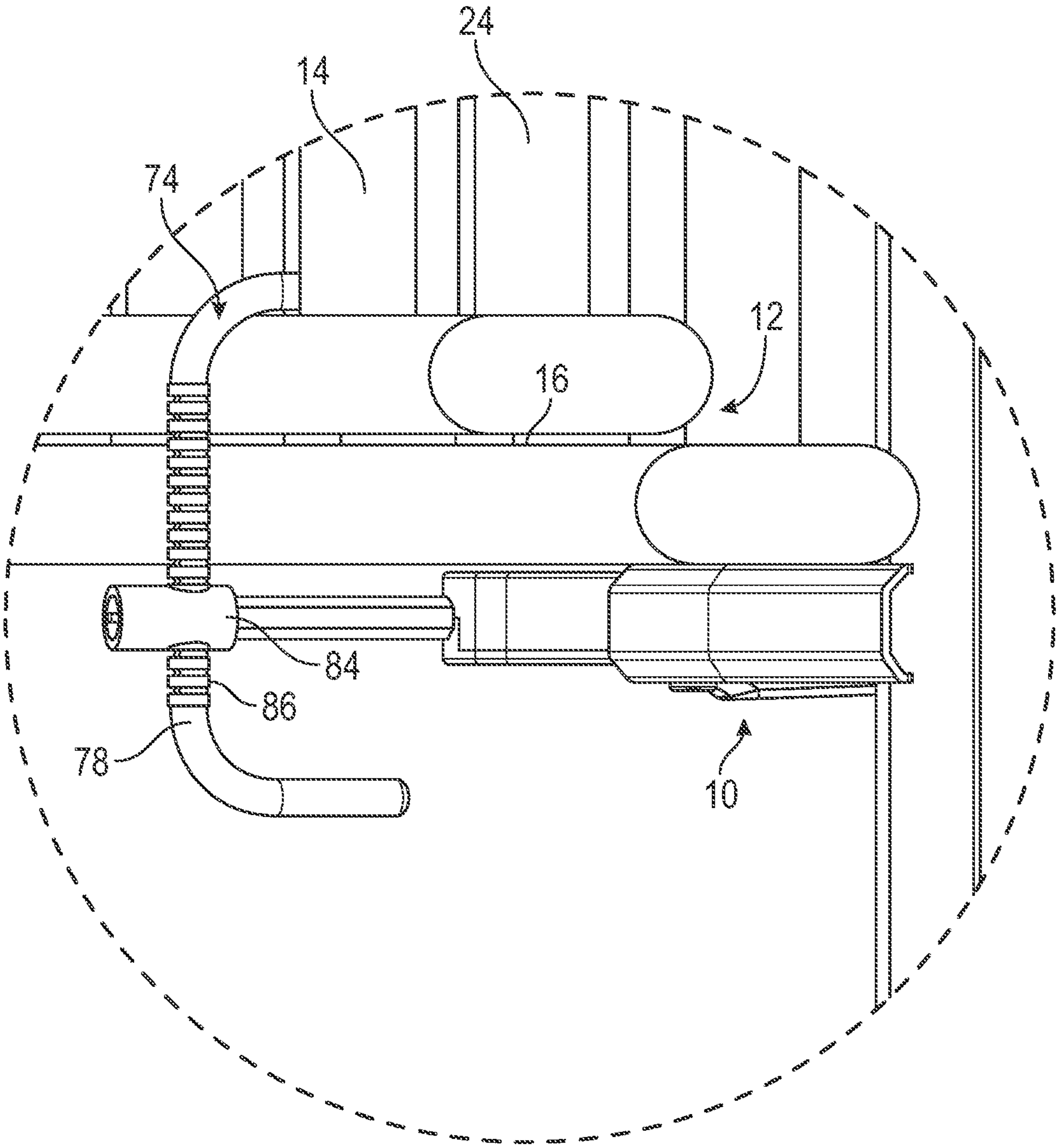
FIG. 4 is a top view of the ladder hook adjustment mechanism.

In addition to being adjustable laterally and rotatably as described above, the ladder hook 40 also include a ladder hook adjustment mechanism 84, as shown in FIG. 4. The ladder adjustment mechanism 84 allows the clamping device 10 to accommodate ladders 12 of varying rail thicknesses. In FIG. 4, the ladder adjustment mechanism 84 locks into and is adjustable between slit indentations 86 on the second hooked end 78 of ladder hook 74. However, alternative ladder adjustment mechanisms 84 are contemplated, such as a threaded mechanism, tether, or elastic member, among others. As best seen in FIG. 4, the first rail 16 and the second rail 18 may each be formed of multiple rails. This rail configuration is known in the art, for example with sliding extension ladders. As shown in FIG. 4, the clamping device 10 is compatible with such sliding extension ladders and is also compatible with a number of different types of ladders.

Referring again to FIGS. 1-3, a user operates the clamping device 10 and applies clamping force with an actuator 88, which is provided with a handle 90. The handle 90 has a stationary grip portion 92 and a lever 94, both disposed on the housing 26. The lever 94 is pivotably attached to the housing 26 and is movable between a rest position, as shown in FIG. 2, and a retracted position. The lever 94 pivots about pivot point 95 on housing 26, which is located above the upper surface 48 of clamp track 46. When a user operates the clamping device 10 and moves the lever 94 from the rest position to the retracted position, a biasing element 96 pushes the lever 94 back towards the rest position. The biasing element 96 is a spring or any other suitable mechanism for biasing the lever 94 to the rest position. The lever 94 also includes a clamp opening 98, which is described in greater detail below. When the clamping device 10 is actuated, the actuator 88 allows for lateral movement of the clamp 40 and the fascia wedge 60 relative to housing 26.

During operation, a user employs the lever 94 to actuate the movement of the clamp 40 towards the first ladder end 28 of the housing 26. The clamp 40 is disposed within and engages with the clamp opening 98 of the lever 94. As such, the clamp opening 98 is dimensioned so that as the lever 94 is actuated from its rest position to its retracted position, an inner surface 100 of the clamp opening 98 comes into contact with and engages the lower surface 50 of the clamp 40. As the lever 94 is actuated, this engagement between the inner surface 100 of the clamp opening 98 and the lower surface 50 slides the clamp 40 towards the first ladder end 28 of the housing 26. This movement draws the fascia wedge 60 towards the ladder hook 74, creating a clamping force that acts on the ladder 12. This clamping force secures the ladder 12 to the structure 14. The lever 94 is actuated repeatedly by the user until sufficient clamping force is acting to secure the ladder 12 to the structure 14.

Once a user is finished using clamping device 10, a clamp track release tab 102 allows for the clamp 40 to be slid away from the ladder end 28 of the housing 26. The clamp track release tab 102 has a release tab opening 104 and is pivotally disposed on the housing 26 proximate the second building end 30. The clamp track 46 is slidably disposed within a release tab opening 104 and engages with an inner surface 106 of the release tab opening 104. The clamp track release tab 102 pivots from an oblique position, as shown in FIG. 3, to a normal position, in which the clamp track release tab 102 is perpendicular to the axis 52. When the clamp track release tab 102 is in the oblique position, the inner surface 106 of the release tab opening 104 is in contact with the clamp track 46 such that the clamp 40 is prevented from moving away from the ladder end 28 of the housing 26. This allows for a user to gradually increase the clamping force acting on the ladder 12 by repeatedly actuating the lever 94 without the clamp 40 sliding away from the ladder end 28 of the housing 26. When the clamp track release tab 102 is actuated by the user into the normal position, the inner surface of the release tab opening 104 is no longer in contact with the clamp track 46, and the clamp 40 may be freely moved away from the ladder end 28 of the housing 26. A similar biasing member such as the biasing element 96 is used to bias the clamp track release tab 102 from the normal position to the oblique position.

Figure 6:
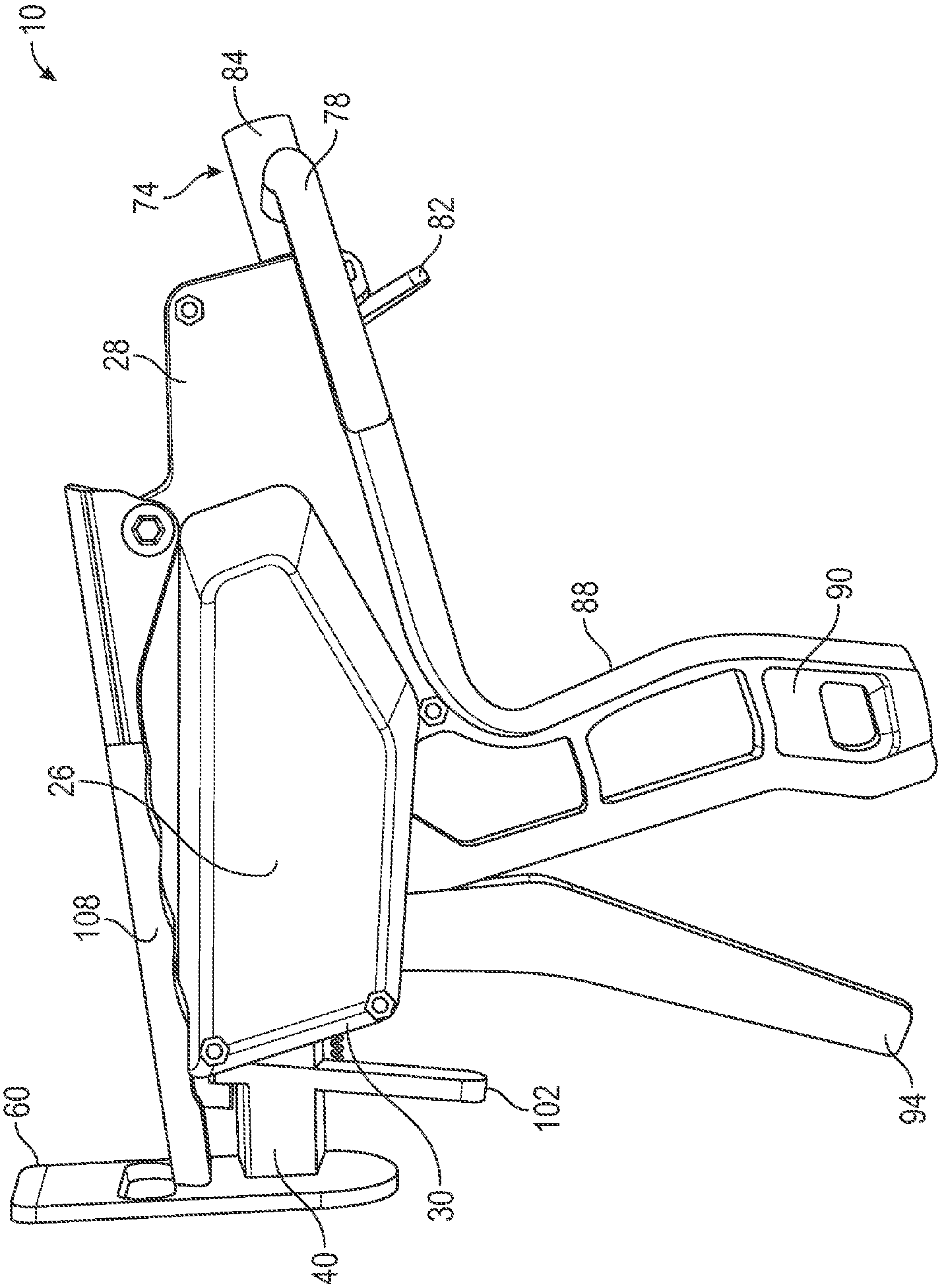
FIG. 6 is a side elevation of the prototype of FIG. 5 in a retracted position.

The clamping device 10 is further provided with a gutter hook 108, which abuts against the gutter 22 of the structure 14 to provide additional stability. The gutter hook 108 is fixed to the housing 26 and pivots between a deployed position, as shown in FIG. 2, and a retracted position, as shown in FIG. 6. In the deployed position, the gutter hook 108 extends from the housing 26 at an oblique angle relative to the axis 52 defined by the clamp 40, as seen in FIG. 3. In the retracted position, the gutter hook 108 is pivoted from the deployed position such that the gutter hook 80 rests against the housing 26 and is substantially parallel to the axis 52 defined by the clamp 40. As best seen in FIG. 2, the engagement surface 110 of the gutter hook 108 is indented to strengthen the engagement between the gutter 22 and the clamping device 10. The clamping device 10 provides sufficient clamping force to secure the ladder 12 to the structure 14 regardless of whether the gutter hook 108 is in the deployed or retracted position.

Figure 5:
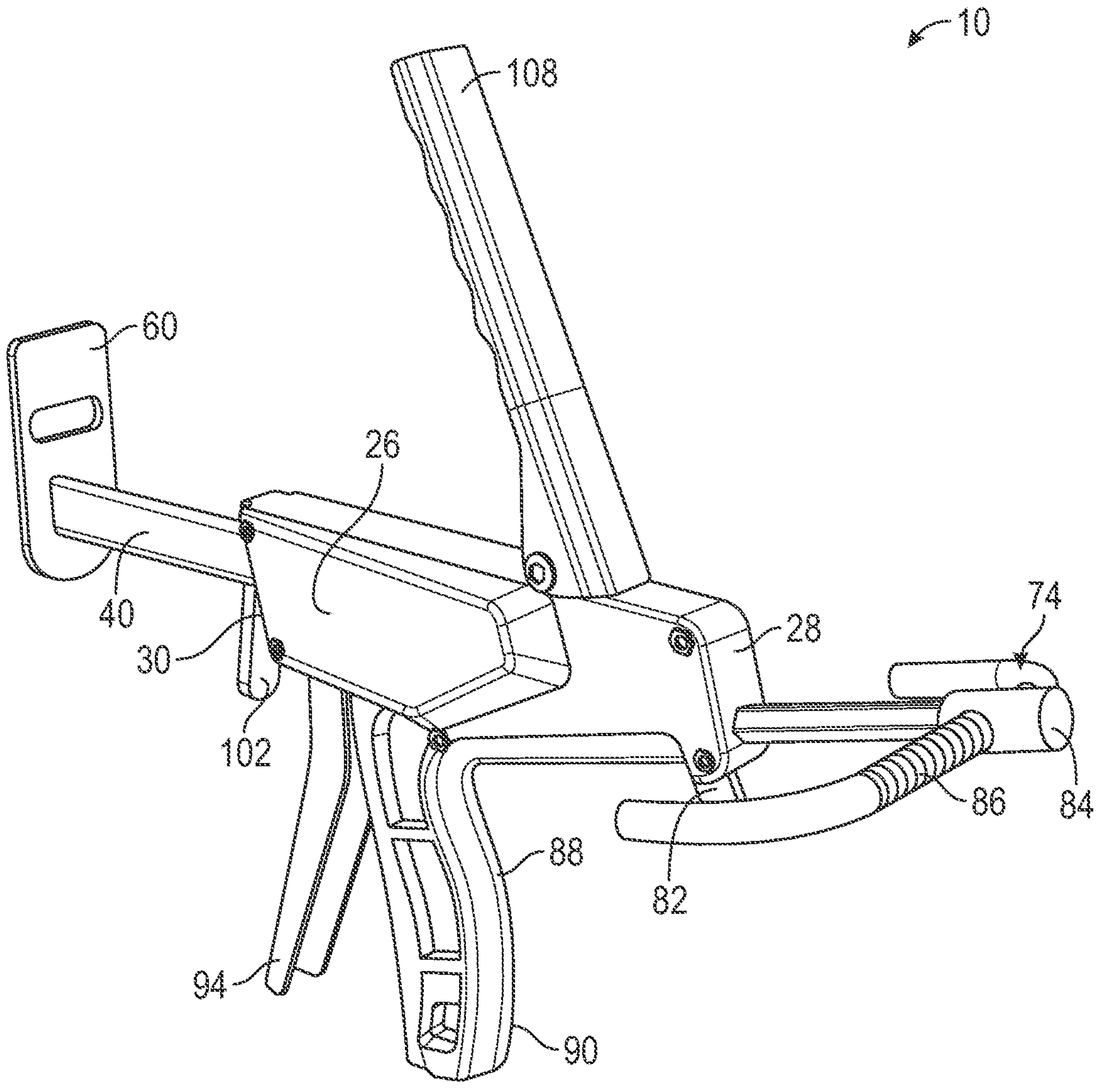
FIG. 5 is a rear perspective view of a prototype of an embodiment of the present clamp in a deployed position.

Referring now to FIGS. 5 and 6, the clamping device 10 is further shown with the clamp 40 in both the extended and retracted position, as well as the gutter hook 108 in both the deployed position and retracted position. FIG. 6 shows the clamping device 10 with the clamp 40 in the retracted position and the gutter hook 108 and the ladder hook 74 in the retracted position. With the clamping device 10 in this position shown in FIG. 6, the clamping device is more compact and better suited for transportation and storage when not in use.

While a particular embodiment of the present ladder fascia clamp and lock has been described herein, it will be appreciated by those skilled in the art that changes and modifications may be made thereto without departing from the invention in its broader aspects and as set forth in the following claims.

The invention claimed is:

1. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

an actuator associated with said housing and configured for causing said lateral reciprocation of said clamp relative to said housing; and said actuator further includes:

a handle comprising a stationary grip portion and a lever pivotally secured to said housing and movable between a rest position and a retracted position, said lever including a clamp opening slidably engaging said clamp;

a biasing element associated with said lever and said housing and configured for biasing said lever to said rest position;

said internal cavity includes a housing track;

said clamp is provided with an upper surface and a lower surface defining a clamp track, said clamp track slidably engaging said clamp opening of said lever and said housing track; and said clamp track is disposed within said clamp opening wherein said clamp opening is dimensioned so that as said lever is actuated from said rest position to said retracted position, an inner surface of said clamp opening engages said lower surface of said clamp, and said inner surface slides said grip end of said clamp towards said ladder end of said housing.

2. The clamping device of claim 1, wherein said lever is configured such that when said lever is actuated, said grip end of said clamp is drawn towards said housing.

3. The clamping device of claim 1, wherein said housing track comprises parallel, vertically spaced ribs;

said parallel spaced ribs are configured to slidably engage said clamp track.

4. The clamping device of claim 1, further comprising a clamp track release tab extending from said second, building end of said housing;

said clamp track release tab having a release tab opening;

wherein said clamp track is slidably disposed within said release tab opening; and said release tab opening is dimensioned so that in a first, oblique position relative to said clamp, said reciprocal movement of said clamp relative to said housing is prevented, and in a second, normal position, said reciprocal movement of said clamp is permitted.

5. The clamping device of claim 1, further comprising a fascia wedge disposed at said grip end of said clamp;

said fascia wedge extending perpendicular relative to an axis defined by said clamp and configured for releasable attachment to the structure.

6. The clamping device of claim 5, wherein said fascia wedge comprises an upper surface and a lower surface, said upper surface of said fascia wedge comprises a first gripping surface and said lower surface of said fascia wedge comprises a second gripping surface.

7. The clamping device of claim 5, wherein said fascia wedge comprises a fascia wedge opening configured to receive a threaded fastener;

wherein said threaded fastener is configured to secure said fascia wedge to the structure.

8. The clamping device of claim 1, further comprising a gutter hook rotatably attached between said first, ladder end, and said second, building end of said housing;

wherein said gutter hook is adjustable between a deployed position and a retracted position; and wherein in said deployed position, said gutter hook extends from said housing at an oblique angle relative to an axis defined by said clamp, and in said retracted position, said gutter hook is substantially parallel to said axis defined by said clamp.

9. The clamping device of claim 1, wherein said ladder hook comprises a first end disposed within said housing, a second hooked end, and an intermediate portion between said first end and said second hooked end; and wherein said ladder hook is laterally adjustable and said intermediate portion is configured to slide into said housing at an oblique angle relative to an axis defined by said clamp.

10. The clamping device of claim 1, wherein said ladder hook comprises a first end disposed within said housing, a second hooked end, and an intermediate portion between said first end and said second hooked end; and wherein said ladder hook is configured to rotate about an axis concentric with said intermediate portion of said ladder hook.

11. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

a handle comprising a lever pivotally secured to said housing and movable between a rest position and a retracted position, said lever including a clamp opening slidably engaging said clamp;

said lever is configured such that when said lever is actuated, said grip end of said clamp is drawn towards said housing;

wherein said internal cavity includes a housing track;

said clamp is provided with an upper surface and a lower surface defining a clamp track, said clamp track slidably engaging said clamp opening of said lever and said housing track;

said lever comprises said clamp opening, and said clamp track is disposed within said opening;

wherein said clamp opening is dimensioned so that as said lever is actuated from said rest position to said retracted position, an inner surface of said clamp opening engages said lower surface of said clamp, and said inner surface slides said grip end of said clamp towards said ladder end of said housing.

12. The clamping device of claim 11, further comprising a clamp track release tab having a release tab opening;

wherein said clamp track is slidably disposed within said opening; and said release tab opening is dimensioned so that in a first, oblique position relative to said clamp, said reciprocal movement of said clamp relative to said housing is prevented, and in a second, normal position, said reciprocal movement of said clamp is permitted.

13. The clamping device of claim 11, wherein said housing track comprises parallel spaced ribs;

said parallel spaced ribs are configured to slidably engage said clamp track.

14. The clamping device of claim 11, further comprising a fascia wedge disposed at said grip end of said clamp;

said fascia wedge extending perpendicular relative to an axis defined by said clamp and configured for releasable attachment to the structure.

15. The clamping device of claim 14, wherein said fascia wedge comprises an upper surface and a lower surface, said upper surface of said fascia wedge comprises a first gripping surface and said lower surface of said fascia wedge comprises a second gripping surface.

16. The clamping device of claim 14, wherein said fascia wedge comprises a fascia wedge opening configured to receive a bolt;

wherein said bolt is configured to secure said fascia wedge to the structure.

17. The clamping device of claim 11, further comprising a gutter hook rotatably attached between said first, ladder end, and said second, building end of said housing;

wherein said gutter hook is adjustable between a deployed position and a retracted position; and wherein in said deployed position, said gutter hook extends from said housing at an oblique angle relative to an axis defined by said clamp, and in said retracted position, said gutter hook is substantially parallel to said axis defined by said clamp.

18. The clamping device of claim 11, wherein said ladder hook comprises a first end disposed within said housing, a second hooked end, and an intermediate portion between said first end and said second hooked end;

wherein said ladder hook is laterally adjustable and said intermediate portion is configured to slide into said housing at an oblique angle relative to an axis defined by said clamp.

19. The clamping device of claim 11, wherein said ladder hook comprises a first end disposed within said housing, a second hooked end, and an intermediate portion between said first end and said second hooked end;

wherein said ladder hook is configured to rotate about an axis concentric with said intermediate portion of said ladder hook.

20. A ladder securing mechanism, comprising a ladder comprising a first rail, a second rail, and rungs extending between the first and second rails;

a clamping device, said clamping device comprising:

a housing having a first, ladder end, and a second, building end opposite said ladder end, said housing defining an internal cavity;

a clamp having a housing end disposed within said housing, a grip end opposite said housing end configured for releasable attachment to a structure, said clamp laterally reciprocating relative to said housing between an extended position and a retracted position;

a ladder hook associated with said ladder end of said housing for releasable engagement with the ladder;

a handle comprising a lever pivotally secured to said housing and movable between a rest position and a retracted position, said lever including a clamp opening slidably engaging said clamp;

said lever is configured such that when said lever is actuated, said grip end of said clamp is drawn towards said housing;

wherein said ladder hook is configured to secure around said first ladder rail;

wherein said internal cavity includes a housing track;

said clamp is provided with an upper surface and a lower surface defining a clamp track, said clamp track slidably engaging said clamp opening of said lever and said housing track;

said lever comprises said clamp opening, and said clamp track is disposed within said opening; and wherein said clamp opening is dimensioned so that as said lever is actuated from said rest position to said retracted position, an inner surface of said clamp opening engages said lower surface of said clamp, and said inner surface slides said grip end of said clamp towards said ladder end of said housing.

21. The clamping device of claim 20, further comprising a fascia wedge disposed at said grip end of said clamp;

said fascia wedge extending perpendicular relative to an axis defined by said clamp and configured for releasable attachment to the structure.

22. The clamping device of claim 20, wherein said fascia wedge comprises an upper surface and a lower surface, said upper surface of said fascia wedge comprises a first gripping surface and said lower surface of said fascia wedge comprises a second gripping surface.

23. The clamping device of claim 20, wherein said fascia wedge comprises a fascia wedge opening configured to receive a bolt;

wherein said bolt is configured to secure said fascia wedge to the structure.

24. The clamping device of claim 20, wherein said ladder hook comprises a first end disposed within said housing, a second hooked end, and an intermediate portion between said first end and said second hooked end;

wherein said ladder hook is laterally adjustable and said intermediate portion is configured to slide into said housing at an oblique angle relative to an axis defined by said clamp.

25. The clamping device of claim 20, wherein said ladder hook comprises a first end disposed within said housing, a second hooked end, and an intermediate portion between said first end and said second hooked end;

wherein said ladder hook is configured to rotate about an axis concentric with said intermediate portion of said ladder hook.

26. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

an actuator associated with said housing and configured for causing said lateral reciprocation of said clamp relative to said housing;

wherein said actuator further includes:

a handle comprising a stationary grip portion and a lever pivotally secured to said housing and movable between a rest position and a retracted position, said lever including a clamp opening slidably engaging said clamp;

a biasing element associated with said lever and said housing and configured for biasing said lever to said rest position;

said internal cavity includes a housing track;

said clamp is provided with an upper surface and a lower surface defining a clamp track, said clamp track slidably engaging said clamp opening of said lever and said housing track;

said clamp track is disposed within said clamp opening;

said housing track comprises parallel, vertically spaced ribs;

said parallel spaced ribs are configured to slidably engage said clamp track.

27. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

an actuator associated with said housing and configured for causing said lateral reciprocation of said clamp relative to said housing;

a gutter hook rotatably attached between said first, ladder end, and said second, building end of said housing;

wherein said gutter hook is adjustable between a deployed position and a retracted position; and wherein in said deployed position, said gutter hook extends from said housing at an oblique angle relative to an axis defined by said clamp, and in said retracted position, said gutter hook is substantially parallel to said axis defined by said clamp.

28. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

an actuator associated with said housing and configured for causing said lateral reciprocation of said clamp relative to said housing;

said ladder hook comprises a first end disposed within said housing, a second hooked end, and an intermediate portion between said first end and said second hooked end; and wherein said ladder hook is laterally adjustable and said intermediate portion is configured to slide into said housing at an oblique angle relative to an axis defined by said clamp.

29. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

a handle comprising a lever pivotally secured to said housing and movable between a rest position and a retracted position, said lever including a clamp opening slidably engaging said clamp;

said lever is configured such that when said lever is actuated, said grip end of said clamp is drawn towards said housing;

a gutter hook rotatably attached between said first, ladder end, and said second, building end of said housing;

wherein said gutter hook is adjustable between a deployed position and a retracted position; and wherein in said deployed position, said gutter hook extends from said housing at an oblique angle relative to an axis defined by said clamp, and in said retracted position, said gutter hook is substantially parallel to said axis defined by said clamp.

30. A clamping device for securing a ladder to a structure, comprising:

a housing having a first, ladder end, and a second, building end opposite said ladder end, said housing defining an internal cavity;

a clamp having a housing end disposed within said housing, a grip end opposite said housing end configured for releasable attachment to the structure, said clamp laterally reciprocating relative to said housing between an extended position and a retracted position;

a ladder hook associated with said ladder end of said housing for releasable engagement with the ladder;

a handle comprising a lever pivotally secured to said housing and movable between a rest position and a retracted position, said lever including a clamp opening slidably engaging said clamp;

said lever is configured such that when said lever is actuated, said grip end of said clamp is drawn towards said housing;

said ladder hook comprises a first end disposed within said housing, a second hooked end, and an intermediate portion between said first end and said second hooked end;

wherein said ladder hook is laterally adjustable and said intermediate portion is configured to slide into said housing at an oblique angle relative to an axis defined by said clamp.

31. A ladder securing mechanism, comprising:

a ladder comprising a first rail, a second rail, and rungs extending between the first and second rails;

a clamping device, said clamping device comprising:

a housing having a first, ladder end, and a second, building end opposite said ladder end, said housing defining an internal cavity;

a clamp having a housing end disposed within said housing, a grip end opposite said housing end configured for releasable attachment to a structure, said clamp laterally reciprocating relative to said housing between an extended position and a retracted position;

a ladder hook associated with said ladder end of said housing for releasable engagement with the ladder;

a handle comprising a lever pivotally secured to said housing and movable between a rest position and a retracted position, said lever including a clamp opening slidably engaging said clamp;

said lever is configured such that when said lever is actuated, said grip end of said clamp is drawn towards said housing;

wherein said ladder hook is configured to secure around said first ladder rail;

wherein said ladder hook comprises a first end disposed within said housing, a second hooked end, and an intermediate portion between said first end and said second hooked end;

wherein said ladder hook is laterally adjustable and said intermediate portion is configured to slide into said housing at an oblique angle relative to an axis defined by said clamp.

* * * * *